H. E. GRABAU & A C. SCHWARTZ.
TIRE CASING.
APPLICATION FILED FEB. 8, 1917.
1,227,426.
Patented May 22, 1917.
3 SHEETS—SHEET 3.
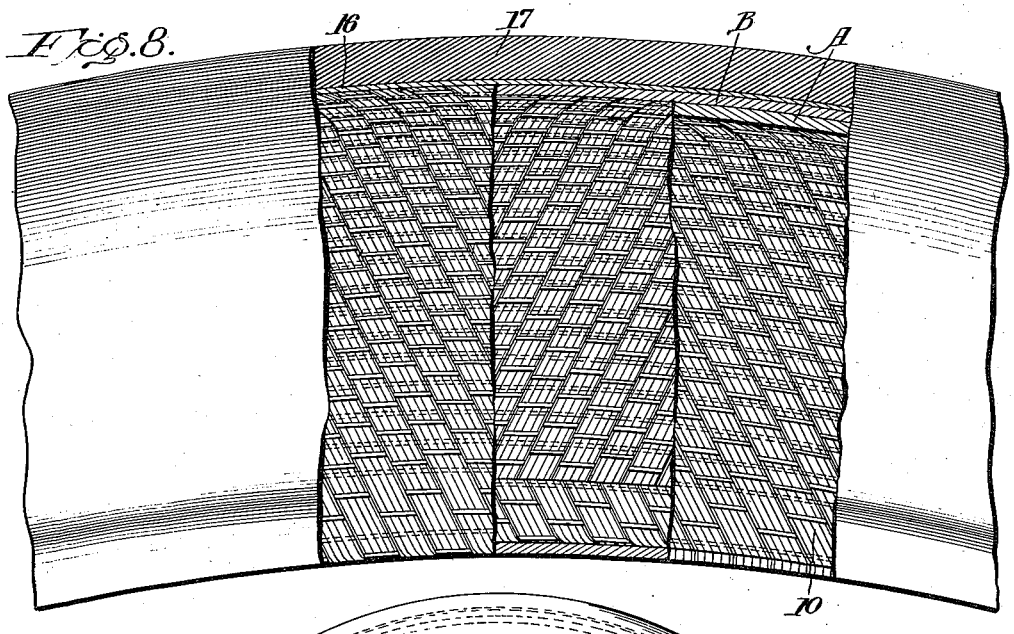
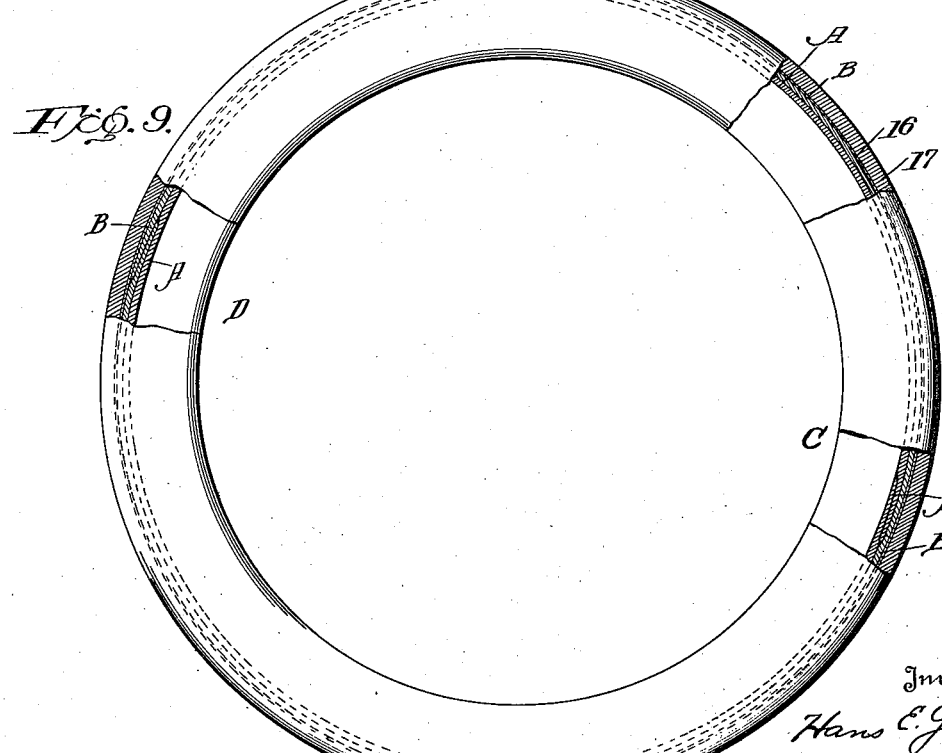

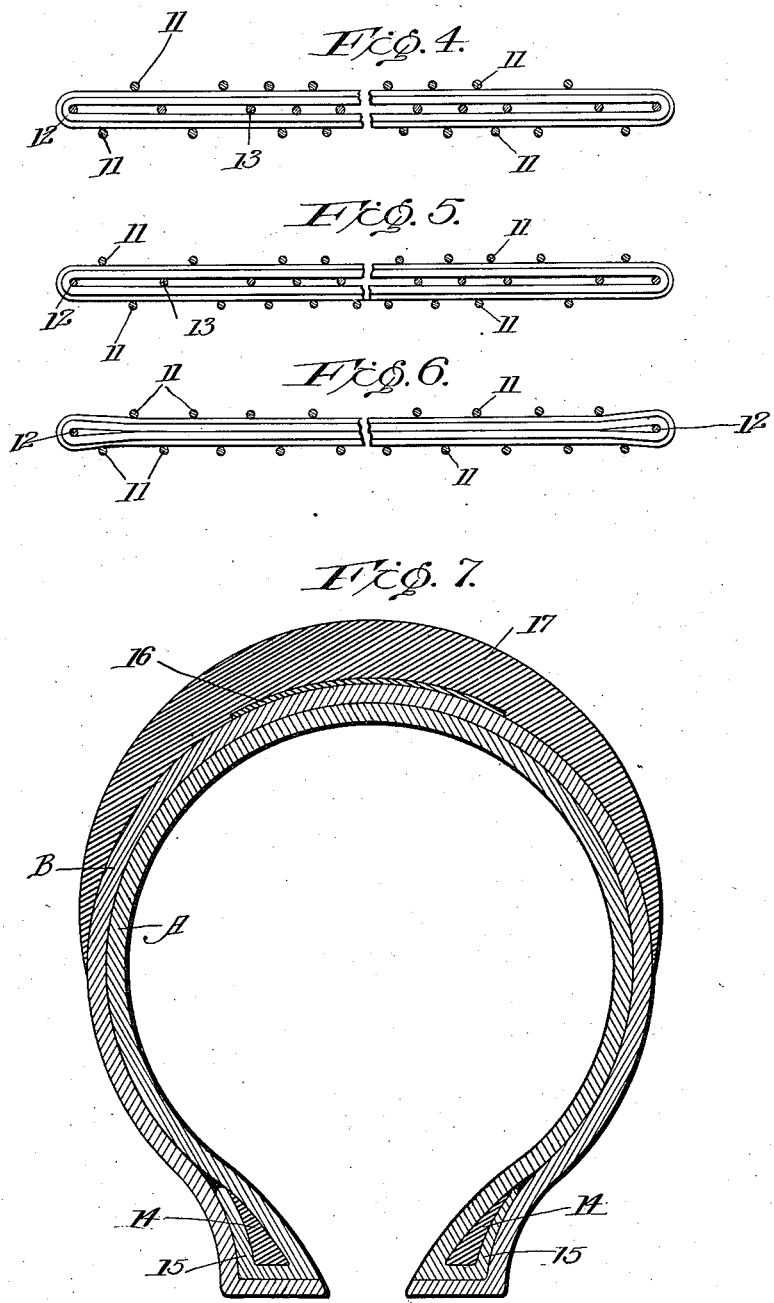

UNITED STATES PATENT OFFICE.

HANS E. GRABAU, OF LONG ISLAND CITY, AND A CHARLES SCHWARTZ, OF NEW YORK, N. Y.; SAID GRABAU ASSIGNOR TO SAID SCHWARTZ.

TIRE-CASING.

1,227,426.       Specification of Letters Patent.     Patented May 22, 1917.

Application filed February 8, 1917. Serial No. 147,369.

*To all whom it may concern:*

Be it known that we, HANS E. GRABAU, who resides in Long Island City, county of Queens, State of New York, and A CHARLES SCHWARTZ, who resides in the borough of Manhattan, city, county, and State of New York, have invented certain new and useful Improvements in Tire-Casings, of which the following is a description.

There are in general use at the present time two distinct types of pneumatic tires, namely, fabric tires and cord tires.

In the manufacture of fabric tires, the carcass is built up by superposing a plurality of layers of relatively thin fabric, which are cemented together and to the tire beads. The number of layers of fabric used varies, with the different manufacturers, from five to seven, or even more. As a result, the cost of manufacture is high because of the amount of labor required to apply the numerous layers, and because of the fact that a large amount of expensive high grade rubber and cement is required to secure the layers together.

It is known that the major portion of the stress upon a tire is the bursting stress, which is due to the air pressure within, and which is resisted by the transverse strength of the tire or carcass. The longitudinal stress, due to the traction of the tire upon the road, is relatively small, and therefore the longitudinal strength of the tire need not be as great as its transverse strength. In fabric tires, however, the fabric is of the same strength transversely and longitudinally, and as a result, in order that the transverse strength may approach the necessary value, there is present an excess of strength in the longitudinal direction. This method of construction is, therefore, extravagant of material, and even though the number of layers of fabric be large, the strength of the tire is not sufficient to insure satisfactory wear, except under the most favorable conditions.

The carcass of the cord tire which overcomes, to some extent, certain of the disadvantages of the fabric tire, consists of one or more layers of cord which are threaded back and forth from one edge of the tire to the other. In order to give such a carcass the requisite longitudinal strength, a large amount of rubber binder must be employed, and also the cords must be given a relatively high obliquity, which decreases their transverse effectiveness. Such tires cost considerable more than fabric tires, because of the relatively large amount of labor, and the expensive material required in their manufacture.

The general object of our invention is to provide, at reduced cost, a tire casing which will have superior strength and wearing qualities, and which will embody all the advantageous features of both the cord and the fabric tires now in common use, but which will eliminate their disadvantages.

We accomplish this object my employing a novel tire fabric, and by securing the fabric to the tire beads in an improved manner, all of which will be fully described hereinafter.

The preferred embodiment of the invention is illustrated in the drawings, in which—

Fig. 4 is a sectional view taken substantially on the line 4—4 of Figs. 1 and 2;

Fig. 5 is a similar sectional view taken on the line 5—5 of Figs. 1 and 2;

Fig. 6 is a sectional view similar to Figs. 4 and 5, showing a modified form of fabric;

Fig. 7 is a transverse sectional view through a tire casing, showing the manner of arranging the strips of fabric;

Fig. 8 is a side elevation of a portion of a tire casing with some of the parts broken away in order to more clearly illustrate the arrangement of the strands in the successive strips of fabric;

Fig. 9 is a side elevation of the casing, a portion being shown in section.

Figure 1:
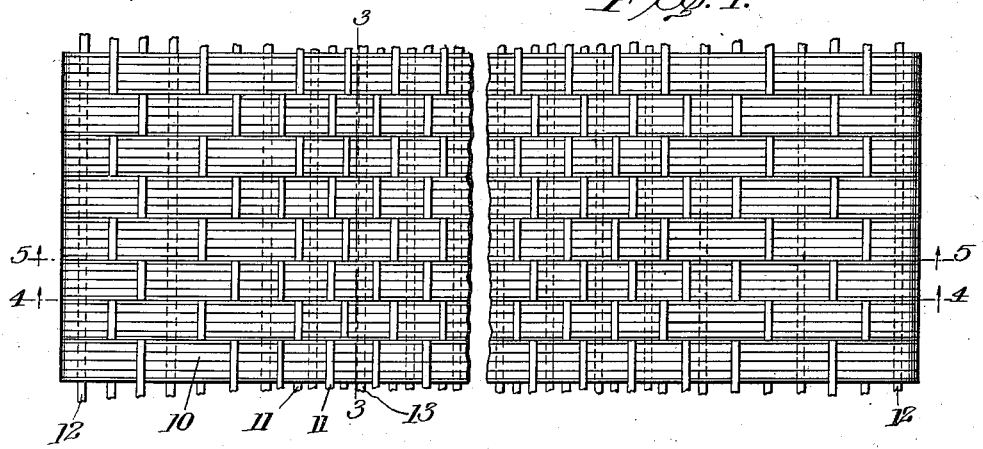
Figure 1 is a plan view of a portion of a strip of fabric with the longitudinal threads and transverse strands at right angles to each other.

As will be seen by reference to Fig. 1, our improved fabric is composed of transverse strands 10, which may constitute the weft, and which are of relatively great diameter and strength, and are placed as closely together as possible, and of relatively small longitudinal threads 11 of small diameter, which may constitute the warp, and which are spaced apart and interwoven with the transverse strands 10. Each strand 10 preferably consists of a plurality of threads or members, which may be parallel, as indicated in the drawing.

It is evident that this fabric has great transverse strength, not only because of the fact that the transverse strands themselves are strong and of large diameter, but also because of the fact that the use of warp or longitudinal threads of small diameter results in there being a maximum number of transverse strands per unit length of material. Obviously, the number of transverse strands per unit length, and hence the strength of the material, increases as the distance between the strands is decreased by decreasing the size of the longitudinal threads. We therefore employ longitudinal threads of a size just sufficient to give the necessary longitudinal strength to the material; and as above pointed out, the required longitudinal strength is slight as compared to the required transverse strength.

We have found a convenient and satisfactory method of weaving the above-described fabric, to consist in passing between alternate warp threads a continuous thread, over and back around edge threads, such as indicated at 12 in Fig. 6, a sufficient number of times, until the strand is of required size. When this is completed, the warps are reversed and the operation is repeated until the next strand is of the desired size, and so on. Each strand is, therefore, in reality a coil, and its upper and lower halves may, if desired, be separated by intermediate warps 13, shown in Figs. 4 and 5, and similar to the edge threads 12. These intermediate warps are, however, not considered necessary or desirable except for extremely large sizes, in which case the fabric is preferably woven in three or four or more plies, with intermediate warps between each two.

Obviously, other methods may be employed for weaving the fabric. For example, instead of building up the transverse strands in the course of the weaving they may be previously built up of a plurality of threads or members, either partially or entirely to the required size, before being interwoven with the warp threads. In any event, it is apparent that the resulting fabric is not only extremely strong transversely, and sufficiently strong longitudinally, but is also very pliable, which is an important quality of tire fabric.

The fabric may either be woven to the exact width required, or may be cut to the desired width. It is preferably treated with rubber or rubber cement, before being applied to the tire core, although this is not absolutely necessary. Also, previously to the weaving, the threads may be impregnated with a similar substance, if desired.

The inner layer A of the fabric is placed on the core in the usual way, except that its edges preferably surround the inner, lower and outer surfaces of the annular beads 14, as clearly shown at 15 in Fig. 7 of the drawing. The second layer B is then superposed upon the inner layer, and its edges are preferably carried around the outside and bottom of the beads 14 as shown, the edges 15 of the layer A lying between the beads and the outer layer, whereby when the whole is vulcanized and welded together under hydraulic pressure, the fabric is firmly anchored to the beads. A narrow breaker strip 16, of any desired kind of fabric, may be arranged outside of the strip B, as indicated, although it is not necessary. The application of the tread rubber 17 and the vulcanizing of the tire may be accomplished in any convenient manner.

In order that each of the strips A and B, may be formed into a complete annulus, the two ends of each strip are overlapped and secured together by vulcanizing under pressure in the usual manner. In the drawing the overlapped ends of the strip A are shown at C, and the overlapped ends of the strip B at D, it being noted that the two overlapped joints are spaced apart sufficiently to distribute whatever slight increase in thickness of the carcass may result, and to equalize the strength of the casing. In overlapping the ends of the strips of our improved fabric, they are so placed that the strands of one end register with the spaces between the strands of the other end. Because of this arrangement, and because of the fact that by reason of their pliable and soft nature, the strands of our fabric are readily flattened under the pressure applied in the manufacture of the tire, an overlapping joint of minimum thickness is provided.

It is obvious that the number of layers of fabric may vary, but we have found that two layers are sufficient for ordinary purposes. The fact that the circumference of the tire at the bead is considerably less than at the tread, renders it necessary to tuck or compress the edges of the fabric in order that it may conform to the tire core. We have found that because of the extreme pliability of our fabric, this tucking or compressing is rendered very easy. In order to further facilitate this operation, however, we may employ more widely spaced warp threads at the edges than at the center, as indicated in Figs. 1 and 2 of the drawing, whereby the pliability of the fabric at the edges is increased.

Figure 2:
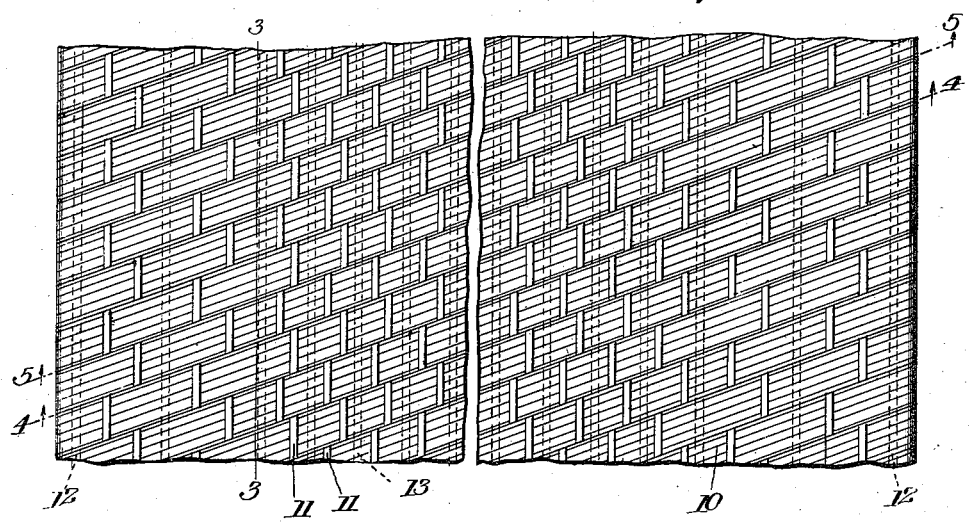
Fig. 2 is a similar view, but showing the strands arranged obliquely.
Figure 3:
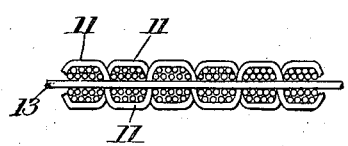
Fig. 3 is a sectional view taken substantially on the line 3—3 in Fig. 1 or 2.

It may be found advisable in some cases to give the transverse strands of the tire fabric a slight obliquity, as indicated in Fig. 2, in order to increase the longitudinal strength without increasing the number or size of the warp or longitudinal threads.

This may be done either by weaving the transverse strands in an inclined direction, with respect to the warp threads, or forcibly distorting the fabric after it has been woven in the ordinary way. If this latter method is resorted to, the rubber or cement with which the fabric is impregnated in the course of manufacture, will retain it in its distorted position. In case it is desired to dispose the transverse strands obliquely in either of the ways above mentioned, it is found preferable to incline the strands of the various layers of fabric in opposite directions, as indicated in Fig. 8 of the drawing.

As will be evident from the above, our improved tire has many advantages over the tires now in common use. The most important advantages are its superior strength and wearing qualities. Also, since the layers of fabric may be applied in substantially the same manner as in the manufacture of ordinary fabric tires, the labor required in the manufacture of our improved tire, is only a fraction of that necessary in the manufacture of other types of tires, such, for example, as the cord tire and the common fabric tire, which latter, as above stated, is built up of many more layers of fabric than are employed by us.

Another advantage of our improved tire resides in the reduction in the amount of rubber employed in the building up of the carcass. This not only reduces the cost of manufacture, but is important from another standpoint. When tires are used in hot weather, they become heated to such an extent that the rubber employed in the manufacture of the carcass becomes softened. This results, naturally, in a weakening of the carcass in proportion to the amount of rubber embodied therein, and often in a failure of the tire. By reducing the amount of rubber in the carcass to a minimum, as we are permitted to do because of the particular qualities of our improved fabric, we have found that the weakening of the casing, as the result of overheating, is negligible.

By employing fabric of the type described herein, we are enabled to make tires which are not only stronger than ordinary fabric tires, but which, because of the fact that the material is concentrated in the transverse strands where the greatest strength is required, are of lighter weight and more flexible and resilient.

We have also discovered a peculiar advantage resulting from the inner surface of the shoe with which the tube contacts being ribbed transversely, as is the case when our improved fabric is employed. The crevices between the ribs are found to provide a storage for the lubricator, such as talc, which is customarily inserted between the tube and casing, and the lubrication is thus rendered much more efficient.

Other advantages of our invention will be obvious to those skilled in the art. While we have described herein an embodiment of our invention which we consider preferable, it is to be noted that we do not wish to limit ourselves to this particular embodiment, since obviously many changes may be made therein without departing from the spirit of our invention.

Having thus described the invention, what is claimed and desired to be secured by the Letters Patent is:

1. A vehicle tire casing including a strip of fabric extending from bead to bead and forming a complete annulus, said strip consisting of transverse flat strands made up of a plurality of straight threads disposed parallel to each other in superposed layers, said flat strands being interwoven with a series of longitudinal threads spaced apart.

2. A vehicle tire casing including a strip of fabric extending from bead to bead and forming a complete annulus, said strip consisting of transverse flat strands made up of a plurality of straight threads disposed parallel to each other in superposed layers with interposed longitudinal straight threads, said flat strands being interwoven with a series of longitudinal threads spaced apart.

3. A vehicle tire casing including a strip of fabric extending from bead to bead and forming a complete annulus, said strip consisting of transverse flat strands made up of a plurality of straight threads disposed parallel to each other, and so interwoven with a series of longitudinal threads that the threads of the strands shall constitute a straight bundle occupying substantially all of the space inclosed by the longitudinal threads.

4. A vehicle tire casing including a strip of fabric extending from bead to bead and forming a complete annulus, said strip consisting of transverse flat strands made up solely of a plurality of straight threads disposed parallel to each other in superposed layers, said flat strands being interwoven with a series of longitudinal threads spaced apart.

5. A vehicle tire casing including an annular strip of fabric extending from bead to bead, said strip consisting of relatively large closely spaced transverse strands interwoven with relatively small longitudinal threads, each strand consisting of a plurality of groups of members, and additional longitudinal threads extending between said groups of members.

6. A vehicle tire casing including an annular strip of fabric extending from bead to bead and consisting of relatively large closely spaced transverse strands, and relatively small widely spaced longitudinal threads, the spacing between said threads being greater adjacent the edges of the strip than at the center thereof.

7. A vehicle tire casing including an annular strip of fabric extending from bead to bead, said strip having oblique transverse strands arranged side by side and connected by longitudinal threads, each strand consisting of a plurality of substantially parallel members extending throughout the width of the strip and about the edges thereof.

8. A vehicle tire casing including an annular strip of fabric extending from bead to bead, said strip having transverse strands arranged side by side and connected by longitudinal threads, each strand consisting of a thread extending across the strip and about the edges a plurality of times.

9. A vehicle tire casing including an annular strip of fabric extending from bead to bead, said strip having oblique transverse strands arranged side by side, a series of longitudinal threads interwoven with the strands, a longitudinal thread at each edge of the strip, each of said strands comprising a plurality of members extending across the strip and about the longitudinal edge threads.

10. A vehicle tire casing including an annular strip of fabric extending from bead to bead, said strip having transverse strands arranged side by side, a series of longitudinal threads interwoven with the strands, a longitudinal thread at each edge of the strip, each of said strands comprising a thread extending across the strip and about the longitudinal edge threads a plurality of times.

11. A vehicle tire casing including an annular strip of fabric extending from bead to bead, said strip having oblique transverse strands arranged side by side, a series of longitudinal threads interwoven with the strands, a longitudinal thread at each edge of the strip, each of said strands comprising a plurality of members extending across the strip and about the longitudinal edge threads, and other spaced longitudinal threads extending between the upper and lower parts of the strands.

HANS E. GRABAU.
A CHARLES SCHWARTZ.